United States Patent
Davydov et al.

(10) Patent No.: US 9,986,373 B2
(45) Date of Patent: May 29, 2018

(54) LTE-A SYSTEMS AND METHOD OF DRS BASED POSITIONING

(71) Applicant: Intel Corporation, Santa Clara, CA (US)

(72) Inventors: Alexei Davydov, Nizhny Novgorod (RU); Jong-Kae Fwu, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 98 days.

(21) Appl. No.: 14/662,886

(22) Filed: Mar. 19, 2015

(65) Prior Publication Data

US 2016/0205499 A1    Jul. 14, 2016

Related U.S. Application Data

(60) Provisional application No. 62/102,180, filed on Jan. 12, 2015.

(51) Int. Cl.
*H04W 4/02* (2018.01)
*G01S 19/05* (2010.01)
(Continued)

(52) U.S. Cl.
CPC .............. *H04W 4/02* (2013.01); *G01S 1/20* (2013.01); *G01S 5/0036* (2013.01); *G01S 5/02* (2013.01);
(Continued)

(58) Field of Classification Search
CPC .......... H04W 4/02; G01S 1/20; G01S 5/0036; G01S 5/02; H04L 5/0048; H04L 5/0035;
(Continued)

(56) References Cited

U.S. PATENT DOCUMENTS

| | | | | |
|---|---|---|---|---|
| 2010/0311437 | A1* | 12/2010 | Palanki | G01S 5/021 455/456.1 |
| 2014/0301301 | A1 | 10/2014 | Cheng et al. | |
| 2014/0334320 | A1* | 11/2014 | Liu | H04W 52/242 370/252 |
| 2015/0189574 | A1* | 7/2015 | Ng | H04W 24/08 370/252 |

(Continued)

FOREIGN PATENT DOCUMENTS

| | | |
|---|---|---|
| WO | WO-2013025057 A2 | 2/2013 |
| WO | WO-2014165712 A1 | 10/2014 |

(Continued)

OTHER PUBLICATIONS

"International Application Serial No. PCT/US2015/063766, International Search Report dated Mar. 16, 2016", 3 pgs.

(Continued)

*Primary Examiner* — Kabir A Timory
(74) *Attorney, Agent, or Firm* — Schwegman Lundberg & Woessner, P.A.

(57) ABSTRACT

A Long Term Evolution Advanced (LTE-A) location server, user equipment (UE) and evolved Node-B (eNB) are generally described. Information may be transmitted to the UE from the location server. The transmission may be triggered by the location server or another entity requesting the UE location. The information may permit the UE to receive a discovery reference signal (DRS) from at least one eNB. The information may contain an indication of measurements to be performed using the DRS. The UE may measure Reference Signal Received Power (RSRP) or Reference Signal Time Difference (RSTD) of the DRS. The UE may send the measurement information to the location server where the UE location is estimated. The UE location may be based on measurements of the DRS and a positioning reference signal (PRS) from one or more eNBs to obtain the Observed Time Difference of Arrival (OTDOA) or Enhanced Cell ID (ECID).

27 Claims, 5 Drawing Sheets

(51) Int. Cl.
*G01S 5/02* (2010.01)
*H04W 64/00* (2009.01)
*G01S 1/20* (2006.01)
*G01S 5/00* (2006.01)
*G01S 5/10* (2006.01)

(52) U.S. Cl.
CPC .............. *G01S 5/0268* (2013.01); *G01S 5/10* (2013.01); *G01S 19/05* (2013.01); *H04W 64/003* (2013.01)

(58) Field of Classification Search
CPC ..... H04L 5/0053; H04L 5/0094; H04L 5/005; H04L 5/0073; H04L 1/00; H04L 27/2656; H04L 25/0202
See application file for complete search history.

(56) References Cited

U.S. PATENT DOCUMENTS

2016/0192376 A1* 6/2016 Lee ....................... H04W 48/20
370/252

FOREIGN PATENT DOCUMENTS

WO    WO-2014189338 A1    11/2014
WO    WO-2016114858 A1    7/2016

OTHER PUBLICATIONS

"International Application Serial No. PCT/US2015/063766, Written Opinion dated Mar. 16, 2016", 6 pgs.

* cited by examiner

LTE-A SYSTEMS AND METHOD OF DRS BASED POSITIONING

PRIORITY CLAIM

This application claims the benefit of priority to U.S. Provisional Patent Application Ser. No. 62/102,180, filed, Jan. 12, 2015, and entitled "DISCOVERY REFERENCE SIGNALS BASED POSITIONING FOR LTE BASED SYSTEMS," which is incorporated herein by reference in its entirety.

TECHNICAL FIELD

Embodiments pertain to radio access networks. Some embodiments relate to positional determination in cellular networks, such as Long Term Evolution (LTE) networks and LTE advanced (LTE-A) networks.

BACKGROUND

Today, mobile communications are ubiquitous, providing voice and data services via user equipment (UE) that operate on Long Term Evolution (LTE) networks such as mobile handset or smartphone type devices, tablets and laptop computers. Many services using mobile communications involve accurate device position determination of UEs, generally through the use of a Global Positioning System (GPS) or Global Navigation Satellite System (GNSS). For example, the commercial use of positioning has grown tremendously in the last several years. Moreover, GPS-enabled UEs enable emergency services to obtain information as to the position of the UE as part of the processing of an emergency call (E911 services). While position determination for E911 services is mandated by the Federal Communications Commission (FCC), in a number of cases, position determination based on GPS signals is ineffective. In particular, GPS may not be available in certain areas due to blockage of the satellite signals, such inside buildings or other areas where the UE may be unable to detect signals from a sufficient number of GPS satellites. This problem may only increase as the FCC guidelines become more stringent, with 67% of outdoor E911 communications presently mandated to be located with 50 m accuracy and 80% of the calls with 150 m accuracy (rising to 90% by 2020). Moreover, the FCC is proposing to extend E911 location determination to indoor locations and further require vertical location information within 3 m of the caller for 67% of indoor E911 communications (rising to 80% by 2020). Unfortunately, the most recent release (release 12) of the $3^{rd}$ Generation Partnership Project (3GPP) standard for Long-Term-Evolution (LTE) networks contains updated requirements that serve to undermine position determination.

It would be desirable to provide accurate location determination for 3GPP LTE networks other than by GPS, such as 3GPP LTE networks configured to operate in accordance with release 12 and later releases.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
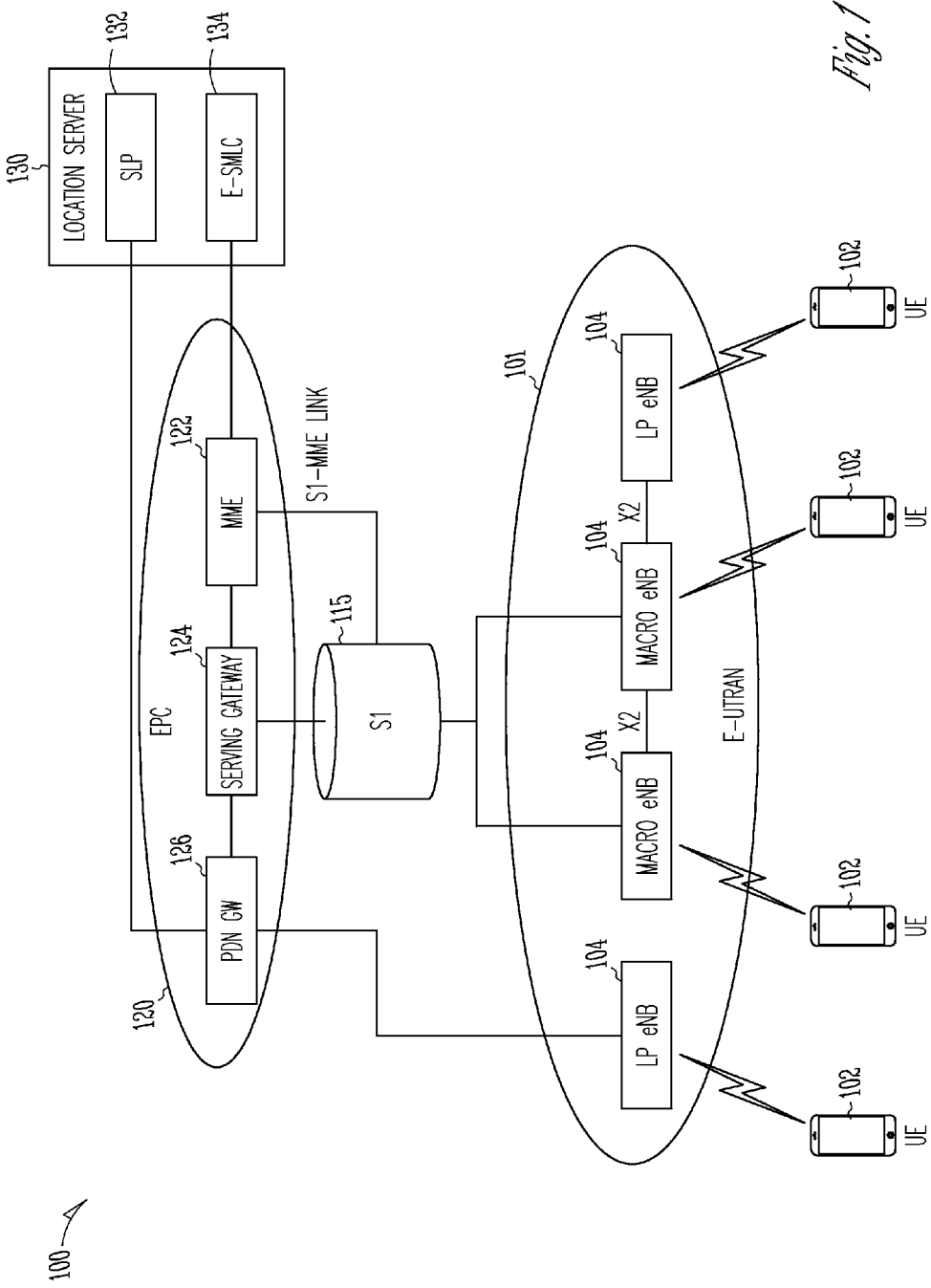
FIG. 1 shows an example of a portion of an end-to-end network architecture of an LTE network with various components of the network in accordance with some embodiments.

FIG. 1 shows an example of a portion of an end-to-end network architecture of a Long Term Evolution (LTE) network with various components of the network in accordance with some embodiments. As used herein, an LTE network refers to both LTE and LTE Advanced (LTE-A) networks. The network 100 may comprise a radio access network (RAN) (e.g., as depicted, the E-UTRAN or evolved universal terrestrial radio access network) 101 and the core network 120 (e.g., shown as an evolved packet core (EPC)) coupled together through an S1 interface 115. For convenience and brevity, only a portion of the core network 120, as well as the RAN 101, is shown in the example.

The core network 120 may include mobility management entity (MME) 122, serving gateway (serving GW) 124, and packet data network gateway (PDN GW) 126. The RAN 101 may include evolved node Bs (eNBs) 104 (which may operate as base stations and serve one or more cells) for communicating with user equipment (UE) 102. The eNBs 104 may include macro eNBs and low power (LP) eNBs.

The MME 122 may be similar in function to the control plane of legacy Serving GPRS Support Nodes (SGSN). The MME 122 may manage mobility aspects in access such as gateway selection and tracking area list management. The serving GW 124 may terminate the interface toward the RAN 101, and route data packets between the RAN 101 and the core network 120. In addition, the serving GW 124 may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 may terminate an SGi interface toward the packet data network (PDN). The PDN GW 126 may route data packets between the EPC 120 and the external PDN, and may perform policy enforcement and charging data collection. The PDN GW 126 may also provide an anchor point for mobility devices with non-LTE access. The external PDN can be any kind of IP network, as well as an IP Multimedia Subsystem (IMS) domain. The PDN GW 126 and the serving GW 124 may be implemented in a single physical node or separate physical nodes.

The PDN GW 126 and MME 122 may also be connected to a location server 130. The UE and eNB may communicate with the location server 130 respectively via the user plane (U-Plane) and/or control plane (C-Plane). The location server 130 may be a physical or logical entity that collects measurement data and other location information from the UE 102 and eNB 104 and assists the UE 102 with an estimation of the position of the UE 102, providing a calculation of the network-based location, as indicated in more detail below. In particular, the UE 102 may be connected to the eNB 104. The eNB 104 may be connected via the control plane to the MME 122, which in turn may be connected to an Evolved Serving Mobile Location Center (E-SMLC) 134 of the location server 130. The eNB 104 may be also connected via the user plane to the Secured User Plane (SUPL) Location Platform (SLP) 132 of the location server 130 through the PDN GW 126. The SLP 132 of the location server 130 may provide information to the UE 102 through the PDN GW 126.

The eNBs 104 (macro and micro) may terminate the air interface protocol and may be the first point of contact for a UE 102. In some embodiments, an eNB 104 may fulfill various logical functions for the RAN 101 including but not limited to RNC (radio network controller functions) such as radio bearer management, uplink and downlink dynamic radio resource management and data packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

The S1 interface 115 may be the interface that separates the RAN 101 and the EPC 120. The S1 interface 115 may be split into two parts: the S1-U, which may carry traffic data between the eNBs 104 and the serving GW 124, and the S1-MME, which may be a signaling interface between the eNBs 104 and the MME 122. The X2 interface may be the interface between eNBs 104. The X2 interface may comprise two parts, the X2-C and X2-U. The X2-C may be the control plane interface between the eNBs 104, while the X2-U may be the user plane interface between the eNBs 104.

With cellular networks, LP cells may be typically used to extend coverage to indoor areas where outdoor signals do not reach well, or to add network capacity in areas with dense usage. In particular, it may be desirable to enhance the coverage of a wireless communication system using cells of different sizes, macrocells, microcells, picocells, and femtocells, to boost system performance. The cells of different sizes may operate on the same frequency band, such as the LTE unlicensed band, or may operate on different frequency bands with each cell operating in a different frequency band or only cells of different sizes operating on different frequency bands. As used herein, the term low power (LP) eNB refers to any suitable relatively low power eNB for implementing a narrower cell (narrower than a macro cell) such as a femtocell, a picocell, or a microcell. Femtocell eNBs may be typically provided by a mobile network operator to its residential or enterprise customers. A femtocell may be typically the size of a residential gateway or smaller and generally connects to the user's broadband line. The femtocell may connect to the mobile operator's mobile network and provide extra coverage in a range of typically 30 to 50 meters. Thus, a LP eNB might be a femtocell eNB since it is coupled through the PDN GW 126. Similarly, a picocell may be a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

Communication over an LTE network may be split up into 10 ms frames, each of which contains ten 1 ms subframes. Each subframe, in turn, may contain two slots of 0.5 ms. Each slot may contain 6-7 symbols, depending on the system used. A resource block (RB) (also called physical resource block (PRB)) may be the smallest unit of resources that can be allocated to a UE. A resource block may be 180 kHz wide in frequency and 1 slot long in time. In frequency, resource blocks may be either 12×15 kHz subcarriers or 24×7.5 kHz subcarriers wide. For most channels and signals, 12 subcarriers may be used per resource block. In Frequency Division Duplexed (FDD) mode, both the uplink and downlink frames are 10 ms and are frequency (full-duplex) or time (half-duplex) separated. In Time Division Duplexed (TDD), the uplink and downlink subframes may be transmitted on the same frequency and may be multiplexed in the time domain. A downlink resource grid may be used for downlink transmissions from an eNB to a UE. The grid may be a time-frequency grid, which is the physical resource in the downlink in each slot. Each column and each row of the resource grid correspond to one OFDM symbol and one OFDM subcarrier, respectively. The duration of the resource grid in the time domain may correspond to one slot. The smallest time-frequency unit in a resource grid may be denoted as a resource element. Each resource grid may comprise a number of the above resource blocks, which describe the mapping of certain physical channels to resource elements. Each resource block may comprise 12 (subcarriers)*14 (symbols)=168 resource elements.

There may be several different physical downlink channels that are conveyed using such resource blocks. Two of these physical downlink channels may be the physical down link control channel (PDCCH) and the physical downlink shared channel (PDSCH). Each subframe may be partitioned into the PDCCH and the PDSCH. The PDCCH may normally occupy the first two symbols of each subframe and carries, among other things, information about the transport format and resource allocations related to the PDSCH channel, as well as H-ARQ information related to the uplink shared channel. The PDSCH may carry user data and higher-layer signaling to a UE and occupy the remainder of the subframe. Typically, downlink scheduling (assigning control and shared channel resource blocks to UEs within a cell) may be performed at the eNB based on channel quality information provided from the UEs to the eNB, and then the downlink resource assignment information may be sent to each UE on the PDCCH used for (assigned to) the UE. The PDCCH may contain downlink control information (DCI) in one of a number of formats that tell the UE how to find and decode data, transmitted on PDSCH in the same subframe, from the resource grid. The DCI format may provide details such as number of resource blocks, resource allocation type, modulation scheme, transport block, redundancy version, coding rate etc. Each DCI format may have a cyclic redundancy code (CRC) and be scrambled with a Radio Network Temporary Identifier (RNTI) that identifies the target UE for which the PDSCH is intended. Use of the UE-specific RNTI may limit decoding of the DCI format (and hence the corresponding PDSCH) to only the intended UE.

Figure 2:
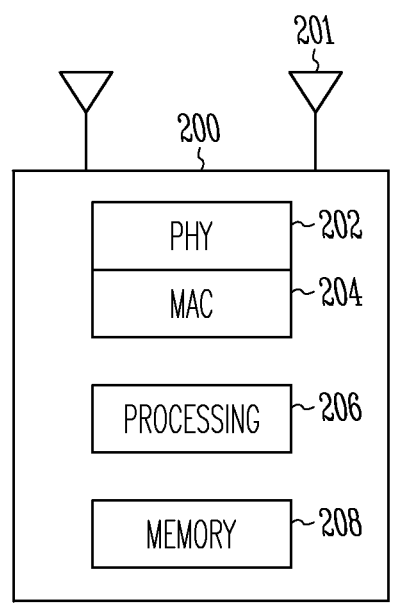
FIG. 2 illustrates a functional block diagram of a communication device in accordance with some embodiments in accordance with some embodiments.

FIG. 2 illustrates a functional block diagram of a communication device (e.g., an UE or eNB) in accordance with some embodiments. The communication device 200 may include physical layer (PHY) circuitry 202 for transmitting and receiving radio frequency electrical signals to and from the communication device, other eNBs, other UEs or other devices using one or more antennas 201 electrically connected to the PHY circuitry. The PHY circuitry 202 may include circuitry for modulation/demodulation, upconversion/downconversion, filtering, amplification, etc. Communication device 200 may also include medium access control layer (MAC) circuitry 204 for controlling access to the wireless medium and to configure frames or packets for communicating over the wireless medium. The communication device 200 may also include processing circuitry 206 and memory 208 arranged to configure the various elements of the cellular device to perform the operations described herein. The memory 208 may be used to store information for configuring the processing circuitry 206 to perform the operations.

In some embodiments, the communication device 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable device, a sensor, or other device that may receive and/or transmit information wirelessly. In some embodiments, the communication device 200 may include one or more of a keyboard, a display, a non-volatile memory port, multiple antennas, a graphics processor, an application processor, speakers, and other mobile device elements. The display may be an LCD screen including a touch screen.

The one or more antennas 201 utilized by the communication device 200 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and different channel characteristics that may result between each of the antennas of a receiving station and each of the antennas of a transmitting station. In some MIMO embodiments, the antennas may be separated by up to $\frac{1}{10}$ of a wavelength or more.

Although the communication device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

The embodiments described may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, the processing circuitry 206 may be configured to receive OFDM communication signals over a multicarrier communication channel in accordance with an OFDMA communication technique. The OFDM signals may comprise a plurality of orthogonal subcarriers. In some broadband multicarrier embodiments, the cellular device 200 may operate as part of a broadband wireless access (BWA) network communication network, such as a Worldwide Interoperability for Microwave Access (WiMAX) communication network or a $3^{rd}$ Generation Partnership Project (3GPP) Universal Terrestrial Radio Access Network (UTRAN) or a Long-Term-Evolution (LTE) communication network or an LTE-Advanced communication network or a fifth generation (5G) LTE communication network or a high speed downlink/uplink access (HSDPA/HSUPA) communication network, although the scope of the invention is not limited in this respect.

As the demand for communicating data (e.g., voice and video) has continued to increase, a RAN may experience increasingly heavy communication traffic. This can lead to adverse network effects such as reduced data rates. To alleviate network traffic on the licensed spectrum, network capacity can be added by providing communication capability to the RAN devices from networks that operate using a communication spectrum not licensed for use by the cellular network devices. Communication peaks may occur locally and the RAN serving the locality may experience peak demand. The locality may include a neighboring Wireless Local Area Network (WLAN) such as an IEEE 802.11 network including a WiFi network. However, because the WLAN network operates in an unlicensed band, availability and characteristics of the channels operating in the band may cause difficulties in providing positional information. UEs and eNBs that operate in the unlicensed band, for example by having WiFi transceivers, in addition to the licensed LTE band are called License Assisted Access (LAA) UEs and LAA eNBs.

While GPS/GNSS is a common method of obtaining the location of a UE, as discussed above however, in situations in which the satellite signals are weak (e.g. indoors), GPS/GNSS may be incapable of providing location information. In these cases, other radio access technology techniques may be used to effect location determination. These techniques may use signals that have a higher received power relative to GNSS signals and may be thus more capable of being used in the situations in which the GNSS signals alone are weak (and thus the UE location may only be able to be obtained after an extremely long time or is simply unable to be obtained), or in cases in which a more accurate location is desired. In particular, position determination may be provided in small cells that use the licensed or unlicensed band through the use of a Discovery Reference Signal (DRS) specified in release 12 of the 3GPP standard, as indicated below.

In general, to obtain UE position using the radio access technology techniques, the MME may receive a request for a location service associated with a particular target UE from another entity or itself initiate the location service on behalf of a particular target UE. The other entity may be a UE, eNB or E-SMLC. The MME may initiate positional determination when for, example an E911 call is made from the UE. The MME may send a location services request to the E-SMLC. The E-SMLC may, in response, transmit assistance information to the UE to assist with UE-based/assisted positioning. The E-SMLC may receive the corresponding measurement data from the UE or eNB serving the UE, determine a positional estimate for the UE and return the positional estimate and/or an indication of assistance information transferred to the UE to the MME. If the location service is requested, rather than being initiated by the MME, the MME may return the location service result to the requesting entity as well as other network entities that may desire the UE location.

The radio access technology techniques currently supported by 3GPP standard include three independent positioning techniques: Assisted Global Navigation Satellite Systems (A-GNSS), Observed Time Difference of Arrival (OTDOA), and Enhanced Cell ID (ECID). A-GNSS systems may use data available from the network, specifically, an earlier determined position of the UE, to either allow the UE to acquire the GNSS satellites faster or help calculate the position of the UE. OTDOA may use predetermined signaling from neighbor cells (i.e., eNBs) to derive an observed time difference of arrival relative to the serving or reference cell. The serving cell may be selected based on received signal strength or quality as determined using signal-to-noise-and-interference ratio (SINR) or reference signal received quality (RSRQ), for example. In particular, typically in OTDOA, the UE may measure the time difference between positioning reference signals (PRS) transmitted by the neighboring cells during a predetermined period of time to estimate the time offsets between the positioning reference signals from the different cells. Higher layer signaling may provide the UE with the positioning reference signal parameters that enables the UE to process the positioning reference signals. Specifically, this information may include the carrier index or frequency band where the positioning reference signal is transmitted, bandwidth of the positioning reference signals, duration (number of consecutive subframes for positioning reference signal transmissions), transmission periodicity, subframe offset and muting sequence. The UE may then report the estimated time offsets with an estimate of the measurement quality to the eNB and the eNB may report this information to the E-SMLC. The E-SMLC may use the time difference estimates, the positions of the cells, which is fixed and known, and the transmit time offsets, which are measured by the UE, to estimate the position of the UE. In one embodiment, the UE may report the estimated time offsets to the SLP.

The ECID technique may estimate the UE position as a function of distance from the serving cell using round trip time between the UE and the eNB, as well as the fixed geographical coordinates of the eNB and the cell size. ECID can be used with a single eNB or with multiple neighboring eNBs in addition to the serving eNB. Specifically, in a single eNB reporting embodiment, the UE may report to the eNB the ID of the serving cell, the measured timing advance (i.e., the difference between transmit and receive time) and the measured received power of the signals from the serving eNB. The eNB may in turn report this information to the E-SMLC. The UE may obtain the cell ID, for example, by paging or from of system information transmitted by the eNB. In a multi-eNB reporting embodiment, the UE may report the same information as in the single eNB embodiment for all eNBs. This is to say that the UE may report the timing advance and power of the signals from each eNB (both the serving eNB and one or more neighbor eNBs) as well as the ID and estimated timing and power of the detected eNB. In either of these embodiments, the measurements may be taken by the UE and based on Reference Signal Received Power (RSRP), Timing Advance (TADV) or Round Trip Time (RTT) estimations. The RSRP may be the average power over the entire bandwidth of resource elements that carry a Cell Specific Reference Signal (CRS). In a further embodiment, angle of arrival information (i.e., the estimated angle of a UE with respect to a reference direction) from one or more eNBs may be provided from the serving eNB to the E-SMLC. The angle of arrival may be measured based on uplink transmissions from the UE and the configuration of the eNB antenna array. The received UE signal between successive antenna elements may be typically phase-shifted by a measurable value. The degree of this phase shift may depend on the angle of arrival, the antenna element spacing, and the carrier frequency. By measuring the phase shift and using eNB characteristics, the angle of arrival can be determined by the eNB. The E-SMLC may estimate the UE position based on the information and knowledge of the positions of the various eNBs.

In general, particular resource elements may be used to transmit reference signals (also called pilots) that are known to both the transmitter and receiver. Examples of conventional reference signals that may be supported by LTE include a primary synchronization signal (PSS), a secondary synchronization signal (SSS), non zero-power CSI-RS and the CRS sent by the cell on a downlink frame. In an active cell, the CRS may be present in all subframes. The PSS and SSS may be used by UEs for cell search and acquisition. The PSS and SSS may be transmitted by an eNB on the downlink in the center 1.08 MHz of the system bandwidth for each cell supported by the eNB. In an active cell, the PSS and SSS may be transmitted in symbol periods 6 and 5, respectively, in subframes 0 and 5 of each frame. Specifically, a PSS may be transmitted in the first subframe for an LTE type 1 frame structure and in the second subframe for an LTE type 2 frame structure. The SSS may be transmitted in the first subframe. A non-zero-power CSI reference signal may be used to obtain channel state information (CSI) for the downlink channel to assist transmission parameter selection at the eNB. The non-zero power CSI-RS may be transmitted periodically in the downlink subframes with a configurable period of, for example, 5, 10, 20, 40 and 80 ms.

The CRS is a reference signal that may be specific for a cell, e.g., generated based on a cell identity (ID). The CRS may be used for different purposes, including RRM measurements. For eNBs with multiple antennae, the same cell specific reference signal may be transmitted from each downlink antenna port. Different eNBs may transmit their cell specific reference signals on the same or different evenly spaced subcarriers, depending on their cell IDs. The CRS may be transmitted in preset symbol periods of each downlink subframe or a downlink pilot time slot (DwPTS) region of subframes. The DwPTS may be transmitted subframes 1 and 6 (depending on the uplink/downlink configuration) with a length that depends on the cell size. The CRS may be used by the UEs for cell search and initial acquisition or to perform, among others, channel quality measurements and channel estimation for coherent demodulation/detection. The CRS and PSS/SSS may be transmitted in the same subframe(s).

Release 12 of the 3GPP specifications introduced discovery reference signals (TS 36.211 v12.4.0, Section 6.11). The discovery reference signal may support synchronization and Radio Resource Management (RRM) measurement for small cells. In one definition, a small cell may transmit signals of low power, e.g., up to about 30 dBm, and encompassing a small area, e.g., 100 m or less, such that only a few users (e.g., tens of users) may be served. Moreover, in release 12 of the 3GPP specifications, small cells may operate in both an "on" or active state or an "off" or dormant state. This may permit a small cell to become dormant when unneeded, thereby decreasing interference in neighboring small cells that is generated by the small cell.

In the active state, the small cells may operate normally, sending downlink control signals such as the PSS, SSS and CRS to the UEs served by the small cells. In particular, of the LTE reference signals used for location determination, the CRS may be present in all subframes, the positioning reference signal and Channel State Information Reference Signal (CSI-RS) are provided periodically every 5, 10, 20, 40 or 80 subframes. However, the constant transmission of the normal reference signals may create a substantial amount of interference with neighboring small cells or introduce co-existence issues with other technologies (e.g. WiFi) operating in the unlicensed bands.

The dormant state may be a sleep or other low power state in which transmissions from the small cells are limited. In particular, in the dormant state, a small cell may not send the normal reference signals in the same manner to the UEs served by the small cell. This may be a particular issue in small cells that operate in an unlicensed LTE band in which the cells provide LTE communications and should coexist with other incumbent technologies such as WiFi. The small cells may enter the dormant state to provide opportunity for WiFi transmission or to avoid creating interference in neighboring small cells if there no traffic. The dormant operation may be an issue for location determination of LTE-A UEs and eNBs, as the reference signals typically used (and expected per previously defined 3GPP standards) by the UEs in a small cell for location determination may be unable to be used for measurements to provide the information needed by the location server in the off state. This is correspondingly likely to cause issues with the mandated E911 location determination accuracy.

Unlike the above reference signals, which are normally transmitted by a cell at predetermined subframes only in the active state, one or more discovery reference signals may be transmitted in both the active and dormant states. Thus, for example, even UEs that are serviced by or located near a small cell in a dormant state may be able to make use of the OTDOA or ECID techniques to support location determination, in addition to supporting mobility by using the measurements to determine handoff conditions. Discovery reference signals may be used for RRM measurements to enhance E-CID or LTE-A positioning techniques using RSRP measurements of the discovery reference signals.

Figure 3:
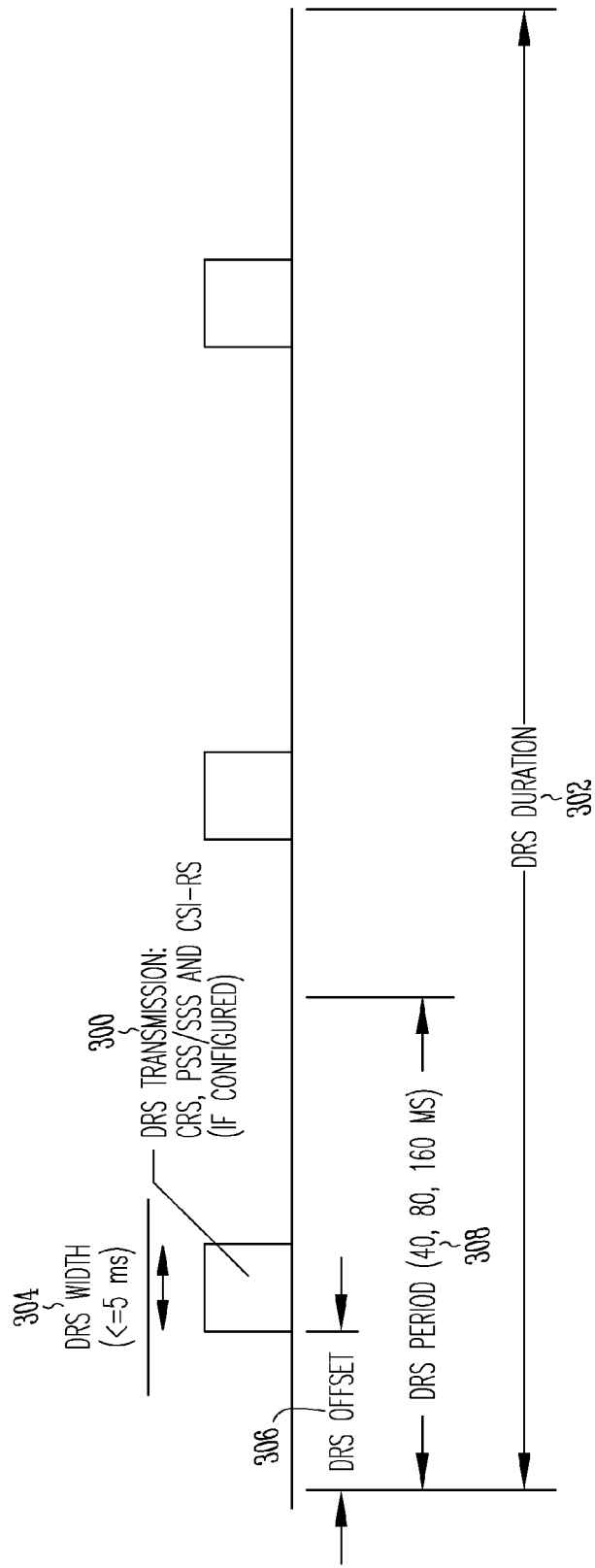
FIG. 3 illustrates a Discovery Reference Signal (DRS) signal in accordance with some embodiments.

FIG. 3 illustrates a discovery reference signal in accordance with some embodiments. In a discovery reference signal-based procedure, the UE can be configured by the E-SMLC with at least one discovery reference signal measurement timing configuration (DMTC) per frequency (used by each cell) by the serving or neighboring eNB. The DMTC may indicate the timing of when the UE may perform cell detection and RRM or positioning measurement based on the discovery reference signal. The DMTC may include period and offset (derived from the dmtc-PeriodOffset information element as defined in release 12) and duration with respect to timing of the primary serving cell timing (from the durationFDD or durationTDD information element both as defined in release 12) of the discovery signal.

The discovery reference signal 300 of FIG. 3 may be transmitted on a normal downlink subframe or in the special switching subframe in the DwPTS region of the special switching subframe. The discovery reference signal 300 may include a PSS/SSS, a CRS, and multiple channel state information reference signal (CSI-RS) resource element (RE) configurations. The CSI-RS configurations may be in the same subframe or be in different subframe(s). As shown in FIG. 3, a discovery reference signal 300 for a cell may comprise a predetermined width 302 of at most about 5 ms and a predetermined duration 308 of N consecutive subframes (where N<5, and is shown in FIG. 3 as N=3), where N is defined in 3GPP release 12 as N=durationFDD or N=durationTDD. The discovery reference signal 300 may be transmitted by each cell over a predetermined period 308 of every M ms (where M is 40, 80, 160). M may be derived from the dmtc-PeriodOffset release 12 information element. In one embodiment, the discovery reference signal may be transmitted in 1-5 consecutive subframes for a type 1 LTE frame structure and in 2-5 consecutive subframes for a LTE type 2 frame structure. The location server or serving eNB may determine the discovery reference signal characteristics of period and duration based on, for example, UE and environmental characteristics as determined (and perhaps saved) at the location server and/or serving eNB. In one embodiment, a longer period between discovery reference signals may be selected when movement of UEs in the cell are relatively slow such that UEs transition across the cell in an extended period of time and thus the discovery reference signals are received by each UE at substantially the same location. Further, a longer duration of the discovery reference signals may be selected when a substantial signal fading or interference is present such that the average power of the discovery reference signals received by the UE increases. In another embodiment, the parameters of the discovery signals may be defined by operator.

In addition, the non-zero power CSI-RS signals may be scrambled independently. The release 12 scramblingIdentity parameter may define the pseudo-random sequence modulating the CSI-RS signal. In particular, the discovery reference signal configuration may include signaling of non-zero-power CSI-RS parameters using the MeasCSI-RS-Config release 12 information element. In the discovery reference signal, the relative subframe offset 306 between the SSS and CSI-RS configuration may be variable or fixed within 5 msec relative to the subframe containing the SSS. The relative subframe offset 302 is defined by subframeOffset as defined in 3GPP release 12.

Discovery signals also have beneficial characteristics that may be of use in a distributed antenna system. In this antenna system, the same CRS and positioning reference signal (PRS) signals may generally be transmitted over the air by the eNB over several geographically distributed antennas. For example, reference signals such as the CRS and PRS may have the same identification and are transmitted in the same manner from each antenna. For example, the conventional CRS and PRS signals may contain the same cell ID information and use the same pseudo-random sequence to scramble the CRS and PRS signals. Thus, RRM measurements of the CRS signals and location measurement of PRS signals may not provide location information from the different antennae. On the other hand, the discovery reference signals transmitted by different antennae may differ. The RRC configuration of the CSI-RS of discovery reference signals may enable transmission of a unique CSI-RS sequence from each distributed antenna associated with the same eNB and sharing the same physical cell identity (Cell ID). The unique signal transmission may facilitate independent RRM measurements and/or independent positioning measurements at the UE for each distributed antenna. The discovery reference signal sent from different antennae thus may differ in substance, having a unique waveform, and/or be transmitted in a different manner (e.g., in different subframes).

As indicated previously, the discovery reference signals may be used to enhance OTDOA positioning by measuring the reference signal time difference (RSTD) using at least one discovery reference signal. The discovery reference signal time difference may be a measure of the subframe timing difference of a reference cell (or transmission point in a distributed antenna system where all distributed antennas or point belong to the same cell) and a neighbor cell (or transmission point) transmitted by the eNBs and received at the UE. Specifically, the reference signal time difference may be measured either between the PRS of one cell (or transmission point) and the discovery reference signal of another cell (or transmission point) or between discovery reference signals of different cells (or transmission points). In the former case, the reference cell may be the serving cell and may supply either the positioning reference signal or the discovery reference signal, while the neighbor cell supplies the other of the positioning reference signal or the discovery reference signal.

Similarly, the discovery reference signals may be used to enhance E-CID positioning by communicating a discovery reference signal measurement result obtained by the UE to the E-SMLC and/or SLP. The measurements performed by the UE and transmitted to the location server may include at least one of the reference signal receive power or the reference signal time difference. The reference signal time difference, along with the Cell ID and/or scrambling ID of the CSI-RS of the discovery reference signal of the corresponding eNB transmitter, may be provided through the serving eNB to the location server. At the location server, the position of the UE may be estimated using the knowledge of the geographical coordinates of the eNB transmitters of the reference signals and the measurements provided by the UE for the corresponding received reference signals.

Figure 4:
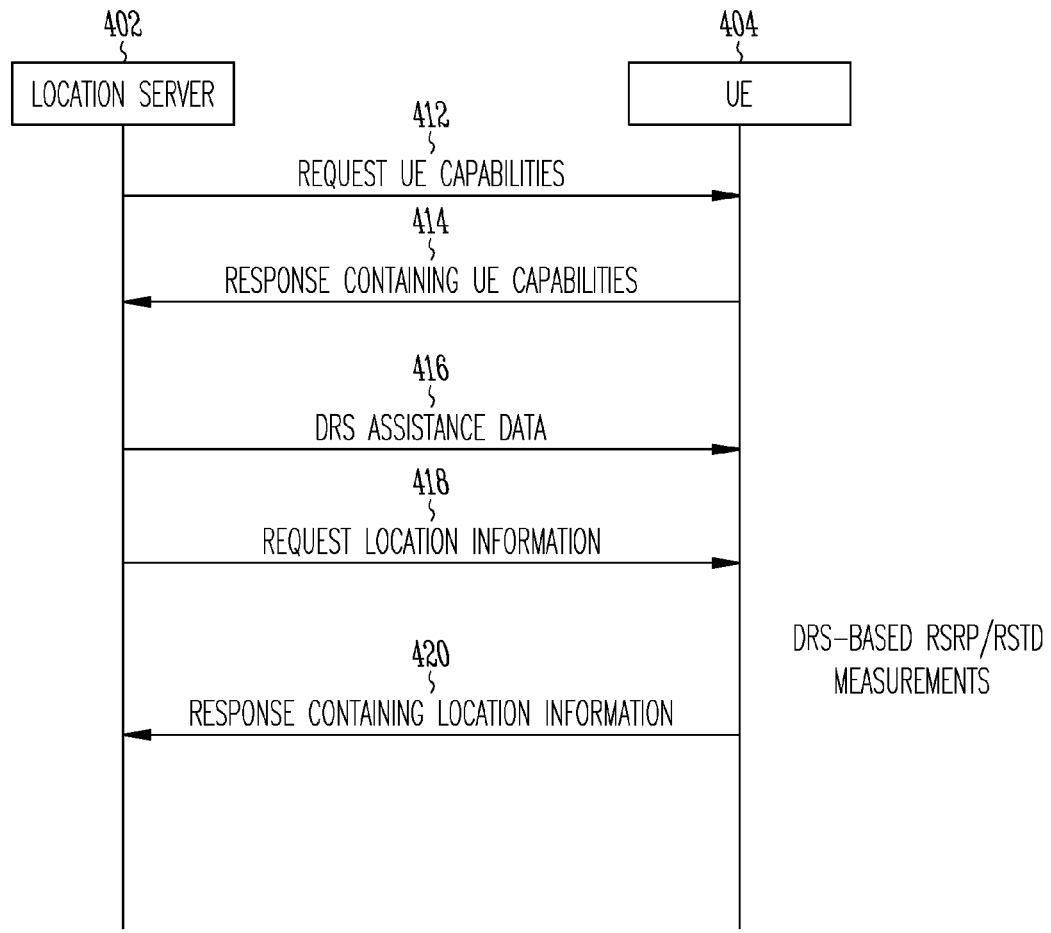
FIG. 4 illustrates communications between the location server and UE in accordance with some embodiments.

FIG. 4 illustrates communications between the location server and UE in accordance with some embodiments. Either the E-SMLC or SLP of the location server 402 or the eNB may thus be considered a LTE network entity with which the UE communicates. The communications may include three sets of communications: an exchange of the UE location capabilities 412, 414, transmission of the discovery reference signals 416 and a location request 418 and communication of the location information 420. Specifically, as shown in FIG. 4, the SMLC or SLP of the location server 402 may communicate with the UE, specifically sending a request at step 412 for the capabilities of the UE 404 for location determination through the network (through an eNB) to the UE 404. The request may be sent from the location server to the UE 404 only once, when the UE 404 first enters any cell served by the location server, or may be transmitted either periodically to the UE 404 (as long as the UE 404 remains in a cell served by the location server) or every time the UE 404 enters a new cell served by the location server. The request may comprise a query to the UE about support by the UE of discovery reference signal-based positioning measurement and reporting.

The UE 404 may, in response to the request, transmit at step 414 its location capabilities to the location server 402. The location capabilities may include the ability of the UE to take particular location-based measurements.

The location server 402, after receiving the response from the UE 404 indicating that the UE 404 is able to perform one or more sets of location measurements and/or determination, may transmit discovery reference signal assistance information to the UE 404 at step 416. The discovery reference signal assistance information may contain information used by the UE 404 to perform the discovery reference signal-based measurements. In particular, the discovery reference signal assistance information may include carrier frequency (or frequency band) of the discovery reference signal which should be detected and measured the UE 404, the DMTC (which as above indicates the timing of when the UE 404 is to perform any cell detection and RRM measurement for each eNB), and discovery reference signal configuration parameters that define the discovery reference signal that should be used by the UE for location measurements and reporting.

The location server 402 may transmit at step 418 a request for location information from the UE 404 after transmitting discovery reference signal assistance information to the UE 404. The location server 402 may determine whether E-CID and OTDOA measurements are more appropriate for the UE 404 to carry out and send the appropriate discovery reference signal assistance information of the eNB(s) for the UE 404 to use in an eNB transmitter list. The information provided to the UE 404 by the location server 402 through the eNB may thus be sufficient to permit the UE to receive a discovery reference signal from at least one eNB, and includes a discovery reference signal parameter configuration, as well as an indication of measurements to be performed using the discovery reference signal.

After receiving the information and request from the location server 402, one of the eNBs may transmit a discovery reference signal in a predetermined subframe, in which the discovery reference signal may convey information regarding a cell identity (ID) of the eNB. One of the eNBs may provide to the UE 404 signaling indicating which cell or cells to monitor for the discovery reference signal, which subframes to monitor for the discovery reference signal, and/or which resources to monitor for the discovery reference signal. The signaling may be provided via a unicast transmission from a cell that is not in the dormant state.

The UE 404 may perform discovery reference signal-based RSRP and/or RSTD measurements based on the information provided in the discovery reference signal assistance information.

The UE 404, after obtaining the discovery reference signal-based RSRP and/or RSTD measurements, may report at step 420 the discovery reference signal-based RSRP and/or RSTD measurements along with a cell ID and/or scrambling identity of CSI-RS determined by the UE 404 to the location server 402 and/or at least one eNB, typically the serving eNB. In some embodiments, the UE 404 may report the discovery reference signal-based RSRP and/or RSTD measurements to the eNB and the eNB in turn may report the discovery reference signal-based RSRP and/or RSTD measurements to the location server 402 without the UE 404 reporting the measurements to the location server 402.

Typically the UE 404, when forwarding the measurement data to the eNB in addition to or instead of to the location server, may provide the discovery reference signal-based RSRP and/or RSTD measurements the eNB of the serving cell. In other embodiments, the UE 404 may provide the discovery reference signal-based RSRP and/or RSTD measurements to a different eNB in addition to or instead of the eNB of the serving cell. For example, the UE 404 may be requested by the location server to measure the RSTD for an OTDOA measurement. As above, the RSTD measurement may be defined as the relative timing difference between a subframe received from the neighboring cell (eNB) and the corresponding subframe from the reference (e.g., serving cell) (eNB). The UE 404 may transmit the RSTD to the serving eNB and also to the neighboring eNB. The UE 404 may take the RSTD measurements on the same signal between cells or on different signals between cells. This is to say that in one embodiment, in determining location based on OTDOA measurements, the UE 404 may measure and transmit to the location server and/or at least one eNB measurements of the discovery reference signal from both the serving cell and the neighboring cell(s). In another embodiment, the UE 404 may measure and transmit to the location server and/or at least one eNB the discovery reference signal of one of the serving and neighboring cells and the positioning reference signal of the other of the serving and neighboring cells. For example, in embodiments in which the neighboring eNB has multiple antennae, measurement by the UE 404 of the discovery reference signal of both the serving and neighboring eNB may provide a better indication of location (as the same positioning reference signal may be transmitted). In embodiments in which RSRP is to be measured, the discovery reference signal of both the serving and neighboring eNB may be used due to the inability of the network to determine the location using the RSRP of positioning reference signals. In any of these cases, however, the UE 404 may transmit the measurements indicated by the location server 402 in the request for location information.

The location server 402 then may estimate the location of the UE using the RSRP and/or RSTD measurements received from the UE 404, as well as using a geographical position of the eNB(s) that has provided the discovery reference signal used by the UE 404 in the measurements. The location server 402 may determine the coordinates but does not make any mobility-related, e.g., handover decisions, which are handled by an entirely different network entity. If multiple eNBs have provided signals, such as one or more discovery reference signals and perhaps one or more positioning reference signals, the location server 402 may estimate the location of the UE using the measurements received from the UE 404, as well as using a geographical position of each eNB that has provided a reference signal used by the UE 404 in the measurements.

Figure 5:
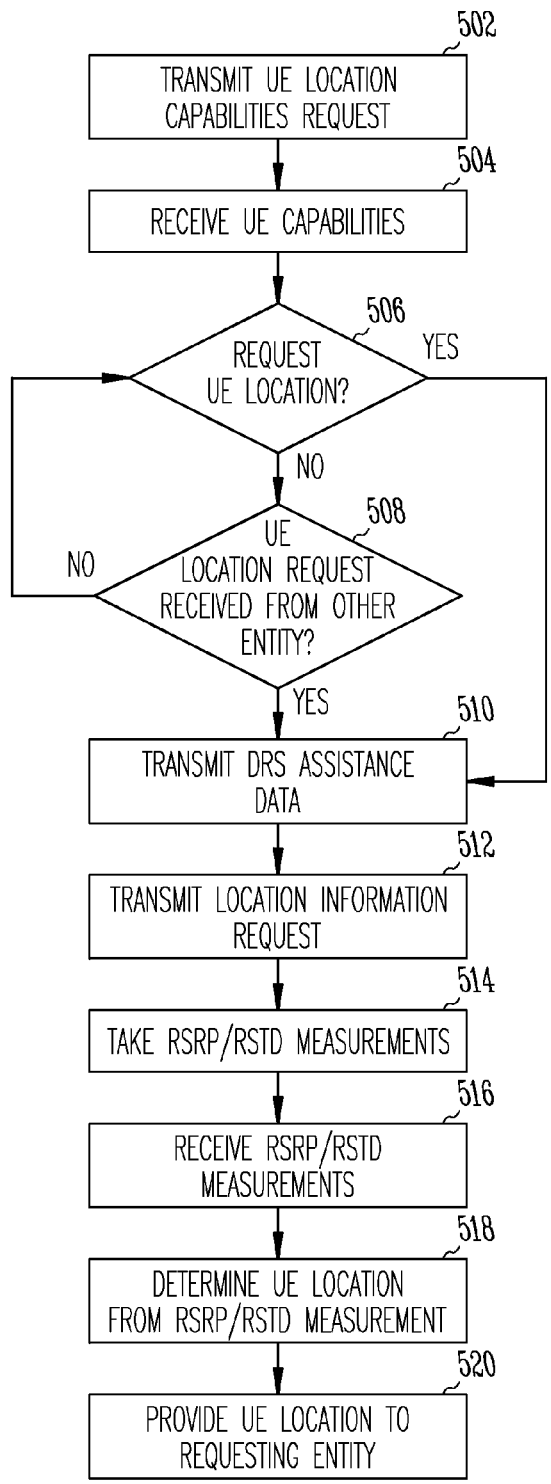
FIG. 5 illustrates a flowchart of a method of determining UE location in accordance with some embodiments.

FIG. 5 illustrates a flowchart of a method of determining UE location in accordance with some embodiments. At step 502, the location server may transmit a request to the UE for location capabilities of the UE. In one embodiment, the request may be transmitted from the SMLC or SLP of the location server 402 shown in FIG. 4. In one embodiment, the request may be sent from the location server to the UE only once. In one embodiment, the request may be transmitted either periodically to the UE. The request may comprise a query to the UE about support by the UE of discovery reference signal-based positioning measurement and reporting.

The UE may respond at step 504 to the location server with the desired location information. In one embodiment, the UE may transmit its location capabilities to the location server. The location capabilities may include the ability of the UE to take particular location-based measurements.

The location server may determine at step 506 whether to request measurement information from the UE. In one embodiment, the location server may make the determination based on the information from the UE that the UE is able to perform one or more sets of location measurements and/or determination.

If the location server determines not to request measurement information from the UE for its own desires, at step 508 the location server may determine whether to request measurement information from the UE for another entity. In one embodiment, the other entity may be a network entity such as the MME, a billing server or the eNB, a commercial server, or the UE. If the location server determines not to request measurement information from the UE for another entity, in one embodiment, the location server waits until a request for UE location information is desired. In other embodiments, steps 506 and 508 may be combined or exchanged.

At step 510, having determined that the UE location information is desired, the location server may transmit DRS assistance information to the UE. In one embodiment, the DRS assistance information may contain information used by the UE to perform discovery reference signal-based measurements. In one embodiment, the DRS assistance information may include carrier frequency (or frequency band) of the discovery reference signal which should be detected and measured the UE, DMTC, and discovery reference signal configuration parameters that define the discovery reference signal that should be used by the UE for location measurements and reporting. In one embodiment, the location server may determine whether E-CID and OTDOA measurements are more appropriate for the UE to carry out and send the appropriate discovery reference signal assistance information of the eNB(s) for the UE to use in an eNB transmitter list.

At step 512, the location server may continue with transmitting the location information request to the UE. In one embodiment, the location information request may provide a transmitter list that indicates the DRS to use from the DRS of different eNBs available to the UE, as well as which measurements to make on the DRS. In one embodiment, the information provided to the UE by the location server may include an indication of measurements to be performed using the discovery reference signal.

The UE may receive the information from the location server. In response, at step 514 the UE may take the requested measurements. In one embodiment, the UE performs discovery reference signal-based RSRP and/or RSTD measurements based on the information provided in the discovery reference signal assistance information.

The UE may subsequently transmit the measurements to the location server, where they are received at step 516. In one embodiment, the information in the report may include the discovery reference signal-based RSRP and/or RSTD measurements along with a cell ID and/or scrambling identity of CSI-RS determined by the UE.

The location server may at step 518 determine the UE location coordinates from the received measurements. In one embodiment, the location server may estimate the location of the UE using the received measurements. In one embodiment, the location server may use a geographical position of the eNB(s) that has provided the discovery reference signal used by the UE in the measurements in addition to the measurements. In one embodiment, the location server may determine the coordinates but not make any mobility-related, e.g., handover decisions. In one embodiment, if multiple eNBs have provided signals, the location server may estimate the location of the UE using the measurements received from the UE, as well as using a geographical position of each eNB that has provided a reference signal used by the UE in the measurements.

The location server may transmit the UE location to another entity, such as the entity making the UE location request, at step 520. In one embodiment, the other entity may be an MME that has initiated the location service on behalf of a particular target UE. In one embodiment, the other entity may be an MME that has received a request for a location service associated with a particular target UE from a third entity. In one embodiment, the third entity may a billing server, a commercial server, or the UE.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A network entity comprising:
   a transceiver configured to communicate with a user equipment (UE); and
   processing circuitry configured to:
      cause the transceiver to transmit to the UE, discovery reference signal assistance information configured to permit the UE to receive a discovery reference signal (DRS) from at least one evolved Node-B (eNB) and an indication of measurements to be performed using the DRS,
      wherein the DRS comprises at least one of:
         a primary synchronization signal,
         a secondary synchronization signal,
         a cell-specific reference signal, or
         one or more independently scrambled channel state information reference signal resource element configurations in which the channel state information reference signal resource element configurations are sent in one of the same subframe or different subframes,
      wherein the discovery reference signal assistance information is based on location capabilities of the UE provided by the UE and comprises discovery reference signal configuration parameters that define the DRS that to be used by the UE for location measurements and reporting,
      wherein the location capabilities include an ability of the UE to take location-based measurements using different location-based techniques, the location-based techniques comprising Observed Time Difference of Arrival (OTDOA) or Enhanced Cell ID (ECID); and
      at least one of:
         estimate a location of the UE based at least in part on the measurements performed by the UE using the DRS; or
         relay the received measurements to another network entity configured to estimate the location of the UE based at least in part on the measurements.

2. The network entity of claim 1, wherein at least one of: the network entity is one of:
   an eNB of the at least one eNB, the processing circuitry is further configured to cause the transceiver to receive the measurements from the UE,
   an Evolved Serving Mobile Location Center (E-SMLC) configured to communicate with the UE through a plurality of network entities, or a Secured User Plane Location Platform (SLP) through a plurality of network entities, or the other network entity is one of a mobility management entity (MME) or an eNB.

3. The network entity of claim 1, wherein the discovery reference signal assistance information comprises at least one of: a frequency band, a DRS measurement timing configuration of the frequency channel indicating a period, a duration and an offset of the DRS to indicate the timing of when to perform cell detection and measurements based on the DRS, a Channel State Information-Reference Signal (CSI-RS) resource element associated with the DRS, or a pseudo-random sequence used to scramble the CSI-RS.

4. The network entity of claim 1, wherein to estimate a location of the UE the processing circuitry is configured to:
calculate the location of the UE using the measurements and a geographical position of the at least one eNB.

5. The network entity of claim 1, wherein the processing circuitry is further configured to:
cause the transceiver to receive, from the UE, measurements performed by the UE based on at least one positioning reference signal (PRS) received by the UE from at least one PRS transmitter,
wherein the estimate of the location of the UE is additionally based at least in part on the at least one PRS and a geographical position of the at least one PRS transmitter.

6. The network entity of claim 1, wherein the measurements include at least one of Reference Signal Received Power (RSRP) or Reference Signal Time Difference (RSTD) measurements of the DRS.

7. The network entity of claim 6, wherein the RSRP measurements of the DRS are at least one of Cell Specific Reference Signal (CRS)-based RSRP measurements or Channel State Information-Reference Signal (CSI-RS)-based RSRP measurements.

8. The network entity of claim 1, wherein the measurements result from using at least one of the OTDOA or ECID technique.

9. The network entity of claim 1, wherein the measurements result from using at least one of the OTDOA or ECID technique and include at least one of Reference Signal Received Power (RSRP) and Reference Signal Time Difference (RSTD) measurements of the DRS of a serving eNB serving the UE or a positioning reference signal (PRS) from a neighboring eNB.

10. The network entity of claim 1, further comprising:
an antenna configured to transmit communications between the transceiver and the UE.

11. The network entity of claim 1, wherein the processing circuitry is further configured to:
determine whether ECID or OTDOA measurements are more appropriate for the UE to carry out for estimation of the location of the UE, wherein the discovery reference signal assistance information is dependent on the ECID or OTDOA measurements determined to be more appropriate,
wherein the measurements performed by the UE using the DRS comprise the determined ECID or OTDOA measurements for the estimation of the location of the UE.

12. A method of location estimation comprising:
transmitting, from a location server to user equipment (UE), a request for capabilities of the UE for network-based location determination;
receiving, from the UE at the location server in response to the request, location capabilities of the UE, the location capabilities comprising an ability of the UE to take location-based measurements using different location-based techniques, the location-based techniques comprising Observed Time Difference of Arrival (OTDOA) or Enhanced Cell ID (ECID);
transmitting, from the location server to the UE, an evolved Node-B (eNB) transmitter list comprising discovery reference signal assistance information to obtain, via measurement at the UE, discovery reference signals (DRS) transmitted by devices on the eNB transmitter list,
wherein each DRS comprises at least one of:
a primary synchronization signal,
a secondary synchronization signal,
a cell-specific reference signal, or
one or more independently scrambled channel state information reference signal resource element configurations in which the channel state information reference signal resource element configurations are sent in one of the same subframe or different subframes,
wherein the discovery reference signal assistance information is dependent on the location capabilities and comprises discovery reference signal configuration parameters that define the DRS that to be used by the UE for location measurements and reporting;
receiving, from the UE at the location server, DRS measurements associated with the transmitted eNB list and based on the DRSs of the devices on the eNB transmitter list; and
estimating a location of the UE using at least the received measurements.

13. The method of claim 12, wherein the eNB transmitter list includes at least one of:
a frequency band, a DRS measurement timing configuration of the frequency channel indicating a period, a duration and an offset of the DRS to indicate the timing of when to perform cell detection and RRM measurement based on the DRS, a Channel State Information-Reference Signal (CSI-RS) resource element associated with the DRS, or a pseudo-random sequence used to scramble the CSI-RS.

14. The method of claim 12, wherein the DRS measurements result from using at least one of the OTDOA or ECID technique.

15. The method of claim 12, further comprising receiving, in response to a request by the location server, location capabilities of the UE.

16. The method of claim 12, wherein the location of the UE is estimated at the location server using the measurement results received from the UE and geographical locations of the devices on the eNB transmitter list.

17. The method of claim 12, wherein:
the discovery reference signal assistance information in the eNB transmitter list further comprises:
the DRS measurements to be performed by the UE,
measurements to be performed by the UE based on at least one positioning reference signal (PRS) received by the UE from at least one PRS transmitter, and
the estimate of the location of the UE is additionally based at least in part on the at least one PRS and a geographical position of the at least one PRS transmitter.

18. The method of claim 12, wherein the DRS measurements result from using at least one of the OTDOA and ECID technique and include at least one of Reference Signal Received Power (RSRP) and Reference Signal Time Difference (RSTD) measurements of the DRS of a serving eNB serving the UE or a positioning reference signal (PRS) from a neighboring eNB such that an estimated position of the UE is determined from the DRS measurements combined with PRS measurements.

19. User equipment (UE) comprising:
a transceiver configured to communicate with a network entity; and
processing circuitry configured to:
cause the transceiver to receive, from the network entity, a request for capabilities of the UE for network-based location determination;
cause the transceiver to transmit, to the location server in response to the request, location capabilities of the UE, the location capabilities comprising an ability of the UE to take location-based measurements using different location-based techniques, the location-based techniques comprising Observed Time Difference of Arrival (OTDOA) or Enhanced Cell ID (ECID);
cause the transceiver to receive from the network entity, discovery reference signal assistance information to permit the UE to receive a discovery reference signal (DRS) from at least one evolved Node-B (eNB) and an indication of DRS measurements to be performed using the DRS,
wherein the DRS comprises at least one of:
a primary synchronization signal,
a secondary synchronization signal,
a cell-specific reference signal, or
multiple independently scrambled channel state information reference signal resource element configurations in which the channel state information reference signal resource element configurations are sent in one of the same subframe or different subframes,
wherein the discovery reference signal assistance information is dependent on the location capabilities and comprises discovery reference signal configuration parameters that define the DRS that to be used by the UE for location measurements and reporting;
cause the transceiver to receive the DRS based on the received discovery reference signal assistance information;
perform the DRS measurements indicated by the received discovery reference signal assistance information using the received DRS, the DRS measurements including at least one of the OTDOA and ECID technique; and
cause the transceiver to transmit the DRS measurements to the network entity.

20. The UE of claim 19, wherein the processing circuitry, in performing DRS measurements using the received DRS, is further configured to:
measure a Reference Signal Received Power (RSRP) or a reference signal time difference (RSTD) using the DRS, wherein the RSRP measurements of the DRS are at least one of Cell Specific Reference Signal (CRS)-based RSRP measurements or Channel State Information-Reference Signal (CSI-RS)-based RSRP measurements.

21. The UE of claim 19, wherein the processing circuitry is further configured to:
perform PRS measurements on a positional reference signals (PRS), the PRS measurements including at least one of OTDOA or ECID technique measurements; and
cause the transceiver to transmit the PRS measurements to the network entity in addition to the DRS measurements.

22. The UE of claim 19, wherein the processing circuitry is further configured to:
in response to the location capabilities indicating that the UE is able to take a predetermined set of location-based measurements, cause the transceiver to receive, from the network entity, the discovery reference signal assistance information to permit the UE to receive the DRS.

23. A non-transitory computer-readable storage medium that stores instructions for execution by one or more processors of a Long Term Evolution Advanced (LTE-A) network entity to configure the network entity to communicate via a transceiver with a License Assisted Access (LAA) user equipment (UE) operating in an unlicensed band, the one or more processors to configure the network entity to:
cause the transceiver to transmit, to the UE, a request for capabilities of the UE for network-based location determination;
cause the transceiver to receive, from the UE in response to the request, location capabilities of the UE, the location capabilities comprising an ability of the UE to take location-based measurements using different location-based techniques, the location-based techniques comprising Observed Time Difference of Arrival (OTDOA) or Enhanced Cell ID (ECID);
determine whether ECID or OTDOA measurements are more appropriate for the UE to carry out for estimation of the location of the UE;
cause the transceiver to transmit to the UE, discovery reference signal assistance information to permit the UE to receive a discovery reference signal (DRS) from at least one evolved Node-B (eNB) and an indication of DRS measurements to be performed using the DRS,
wherein the discovery reference assistance information comprises discovery reference signal configuration parameters that define the DRS that to be used by the UE for location measurements and reporting,
wherein the discovery reference signal assistance information is dependent on the ECID or OTDOA measurements determined to be more appropriate,
wherein the discovery reference signal assistance information is dependent on the location capabilities,
wherein the DRS comprises at least one of:
a primary synchronization signal,
a secondary synchronization signal,
a cell-specific reference signal, or
multiple independently scrambled channel state information reference signal resource element configurations in which the channel state information reference signal resource element configurations are sent in one of the same subframe or different subframes
cause the transceiver to transmit to the UE, measurements to be performed using a discovery reference signal (DRS) and a frequency channel, a DRS measurement timing configuration of the frequency channel indicating a period, a duration and an offset of the DRS to indicate the timing of when to perform cell detection and measurements based on the DRS, a Channel State Information-Reference Signal (CSI-RS) resource element associated with the DRS, and a scrambling of CSI-RS of at least one evolved Node-B (eNB) configured to transmit the DRS;
cause the transceiver to receive, from the UE, positioning measurements based on the DRS, the positioning measurements comprising the determined ECID or OTDOA measurements for the estimation of the location of the UE; and estimate a location of the UE based at least in part on the received positioning measurements.

24. The non-transitory computer-readable storage medium of claim 23, wherein at least one of:
   the network entity is one of:
   an eNB of the at least one eNB, the processing circuitry is further configured to cause the transceiver to receive the measurements from the UE,
   an Evolved Serving Mobile Location Center (E-SMLC) configured to communicate with the UE through a plurality of network entities, or
   a Secured User Plane Location Platform (SLP) through a plurality of network entities, or
   the other network entity is one of a mobility management entity (MME) or an eNB.

25. The non-transitory computer-readable storage medium of claim 23, wherein the processor is further configured to:
   calculate the location of the UE using the received positioning measurements and a geographical position of the at least one eNB.

26. The non-transitory computer-readable storage medium of claim 23, wherein the processor is further configured to:
   cause the transceiver to receive, from the UE, measurements based on at least one PRS positioning reference signal (PRS) received from at least one PRS transmitter; and
   estimate the location of the UE using the measurements based on the at least one PRS measurement and a geographical position of the at least one PRS transmitter in addition to based on the positioning measurements.

27. The non-transitory computer-readable storage medium of claim 23, wherein the positioning measurements include Reference Signal Received Power (RSRP) or Reference Signal Time Difference (RSTD) measurements obtained from the DRS, wherein the RSRP measurements of the DRS are at least one of Cell Specific Reference Signal (CRS)-based RSRP measurements or CSI-RS-based RSRP measurements.

* * * * *